(12) United States Patent
Kim et al.

(10) Patent No.: US 8,546,021 B2
(45) Date of Patent: Oct. 1, 2013

(54) NON-AQUEOUS ELECTROLYTE SOLUTION FOR LITHIUM SECONDARY BATTERY AND LITHIUM SECONDARY BATTERY COMPRISING THE SAME

(75) Inventors: Soo-Jin Kim, Daejeon (KR); Jeong-Ju Cho, Daejeon (KR); Su-Jin Yoon, Gyeonggi-do (KR); Mi-Young Son, Daejeon (KR); Jong-Ho Jeon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 434 days.

(21) Appl. No.: 12/808,614

(22) PCT Filed: Dec. 17, 2008
(Under 37 CFR 1.47)

(86) PCT No.: PCT/KR2008/007487
§ 371 (c)(1),
(2), (4) Date: Oct. 8, 2010

(87) PCT Pub. No.: WO2009/078668
PCT Pub. Date: Jun. 25, 2009

(65) Prior Publication Data
US 2011/0206997 A1    Aug. 25, 2011

(30) Foreign Application Priority Data
Dec. 17, 2007   (KR) .................. 10-2007-0132392

(51) Int. Cl.
*H01M 6/18* (2006.01)

(52) U.S. Cl.
USPC ........... 429/307; 429/199; 429/200; 429/322; 429/323; 429/330; 429/331; 429/334; 252/62.2

(58) Field of Classification Search
USPC ............... 429/307, 199, 200, 322, 323, 330, 429/331, 334; 252/62.2
See application file for complete search history.

(56) References Cited

U.S. PATENT DOCUMENTS

| | | |
|---|---|---|
| 2002/0076619 A1 | 6/2002 | Yamada et al. |
| 2004/0197668 A1 | 10/2004 | Jung et al. |
| 2006/0035154 A1 | 2/2006 | West et al. |
| 2007/0065728 A1 | 3/2007 | Zhang et al. |
| 2007/0122717 A1 | 5/2007 | Shimizu et al. |
| 2009/0286155 A1 * | 11/2009 | Takehara ................. 429/199 |
| 2010/0015514 A1 | 1/2010 | Miyagi et al. |

FOREIGN PATENT DOCUMENTS

| | | |
|---|---|---|
| JP | 01-117838 A | 5/1989 |
| JP | 2002-134169 A | 5/2002 |
| JP | 2003-173816 A | 6/2003 |
| JP | 2003-323915 A | 11/2003 |
| JP | 2007-149656 A | 6/2007 |
| KR | 10-2003-0059729 A | 7/2003 |
| KR | 10-2004-0065152 A | 7/2004 |
| KR | 10-2007-0006253 A | 1/2007 |
| WO | WO 2007/094625 A1 | 8/2007 |
| WO | WO 2007/094626 A1 | 8/2007 |
| WO | WO 2008/023744 * | 2/2008 |

OTHER PUBLICATIONS

Nakajima T. et al. "Effect of addition of fluoroethers to organic solvents for lithium ion secondary batteries," Journal of Flourine Chemistry, 2001, vol. 111, pp. 167-174.

Smart M. C. et al. "Improved Performance of lithium-ion cells with the use of fluorinated carbonate-based electrolytes," Journal of Power Sources, 2003, 119-121, pp. 359-367.

* cited by examiner

*Primary Examiner* — Laura Weiner
(74) *Attorney, Agent, or Firm* — Birch, Stewart, Kolasch & Birch, LLP.

(57) ABSTRACT

A non-aqueous electrolyte solution for a lithium secondary battery includes a lithium salt and an organic solvent and further includes a solvent having a fluoro group and a specific siloxane compound. A lithium secondary battery having the above non-aqueous electrolyte solution exhibits greatly improved capacity recovery characteristics after high temperature storage and also reduces side effects such as swelling.

6 Claims, 2 Drawing Sheets

NON-AQUEOUS ELECTROLYTE SOLUTION FOR LITHIUM SECONDARY BATTERY AND LITHIUM SECONDARY BATTERY COMPRISING THE SAME

TECHNICAL FIELD

The present invention relates to a non-aqueous electrolyte solution for lithium secondary batteries, which includes a solvent with a fluoro group, and a lithium secondary battery containing the same.

BACKGROUND ART

Recently, interests on energy storage technologies are more increased. As the energy storage technologies are extended to cellular phones, camcorders and notebook PC, and further to electric vehicles, the demand for high-energy concentration of a battery used as a power source of such an electronic device is increased. A lithium ion secondary battery is one of the most satisfactory batteries, and many studies are now in active progress.

Among secondary batteries currently used, a lithium secondary battery developed in the early 1990's includes an anode made of carbon material capable of intercalating or disintercalating lithium ions, a cathode made of lithium-containing oxide, and a non-aqueous electrolyte solution obtained by dissolving a suitable amount of lithium salt in a mixed organic solvent.

The lithium secondary battery has an average discharge voltage of about 3.6 to 3.7V, which is advantageously higher than those of other batteries such as alkali batteries or nickel-cadmium batteries. To give such a high operation voltage, an electrolyte composition electrochemically stable in a charging/discharging voltage range from 0 to 4.5V is required. For this purpose, a mixed solvent in which a cyclic carbonate compound such as ethylene carbonate or propylene carbonate and a linear carbonate compound such as dimethyl carbonate, ethylmethyl carbonate or diethyl carbonate are suitably mixed is used as a solvent of electrolyte. A solute of electrolyte commonly uses a lithium salt such as $LiPF_6$, $LiBF_4$ and $LiClO_4$, which acts as a source for supplying lithium ions in a battery and thus enables the lithium battery to operate.

Meanwhile, to improve life cycle and performance of a battery, non-aqueous electrolyte solutions obtained by various compounds to the above-mentioned non-aqueous electrolyte solutions have been proposed. For example, a solvent with a fluoro group such as fluoroethylene carbonate (FEC) is known as enhancing ion conductivity and thus improving life cycle and performance of a battery when being added to a non-aqueous electrolyte solution since it has a high polarity and an increased oxidation potential. However, a battery having a non-aqueous electrolyte solution to which a solvent with a fluoro group is added exhibits a great increase of thickness when the battery is kept at a high temperature. Namely, the battery is swelled due to gas generation, so problems occur in sets such as cellular phones and notebooks.

Meanwhile, Korean Laid-open Patent Publication No. 2003-59729, Japanese Laid-open Patent Publication No. 2003-323915, No. 2002-134169 and No. 2003-173816 disclose non-aqueous electrolyte solutions containing siloxane compounds. However, these documents fail to teach the addition of a solvent with a fluoro group or any effects obtained by the addition.

DISCLOSURE

Technical Problem

The present invention is designed to solve the problems of the prior art, and therefore it is an object of the present invention to provide a non-aqueous electrolyte solution for a lithium secondary battery, which may solve a problem caused by the addition of a solvent with a fluoro group and thus improve a capacity recovery characteristic of a battery after a high temperature storage and solving a swelling phenomenon of the battery, and a lithium secondary battery containing the same.

Technical Solution

In order to accomplish the above objective, the present invention provides a non-aqueous electrolyte solution for a lithium secondary battery, which includes a lithium salt and an organic solvent, wherein the non-aqueous electrolyte solution further includes a solvent having a fluoro group and a siloxane compound expressed by the following chemistry figure 1.

$$R_1\text{---}Si(R_2)(R_3)\text{-}[0\text{-}Si(R_4)(R_5)]_n\text{---}R_6 \qquad \text{Chemistry Figure 1}$$

where n is an integer of 1 to 3, and $R_1$, $R_2$, $R_3$, $R_4$, $R_5$ and $R_6$ are independently carbonated hydrogen with 1 to 4 carbons. $R_1$ to $R_6$ may be branched or linear alkyl, alkene or alkyne.

In the non-aqueous electrolyte solution for a lithium secondary battery according to the present invention, the solvent having a fluoro group is preferably any one selected from compounds expressed by the following chemistry figures 2 to 5, or their mixtures:

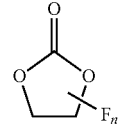

Chemistry FIG. 2 where n is an integer of 1 to 4.

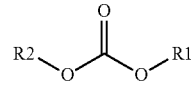

Chemistry FIG. 3 where R1 and R2 are independently carbonated hydrogen group having 1 to 3 carbons, and at least one of R1 and R2 includes 1 to 7 fluorines.

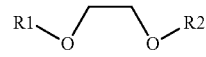

Chemistry FIG. 4 where R1 and R2 are independently carbonated hydrogen group having 1 to 3 carbons, and at least one of R1 and R2 includes 1 to 7 fluorines.

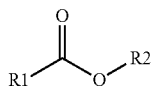

Chemistry FIG. 5 where R1 and R2 are independently carbonated hydrogen group having 1 to 3 carbons, and at least one of R1 and R2 includes 1 to 7 fluorines.

In the non-aqueous electrolyte solution for a lithium secondary battery according to the present invention, the organic solvent is preferably any one selected from the group consisting of a cyclic carbonate selected from the group consisting of propylene carbonate, ethylene carbonate and vinylene carbonate, or their mixtures, a linear carbonate selected from the group consisting of diethyl carbonate, dimethyl carbonate, methylethyl carbonate and dipropyl carbonate, or their mixtures, dimethyl sulfoxide, acetonitrile, dimethoxyethane, diethoxyethane, sulforan, gamma-butyrolactone, ethylene sulfite, propylene sulfite, tetrahydrofuran, ethyl propionate and propyl propionate, or their mixtures. More preferably, the organic solvent uses ethylene carbonate or a mixture of ethylene carbonate and propylene carbonate.

The above non-aqueous electrolyte solution may be usefully applied to common lithium secondary batteries having an anode and a cathode.

Advantageous Effects

A lithium secondary battery having the non-aqueous electrolyte solution according to the present invention exhibits improvement in swelling and also greatly improved capacity recovery characteristics after high temperature storage since a solvent having a fluoro group is added to the non-aqueous electrolyte solution.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
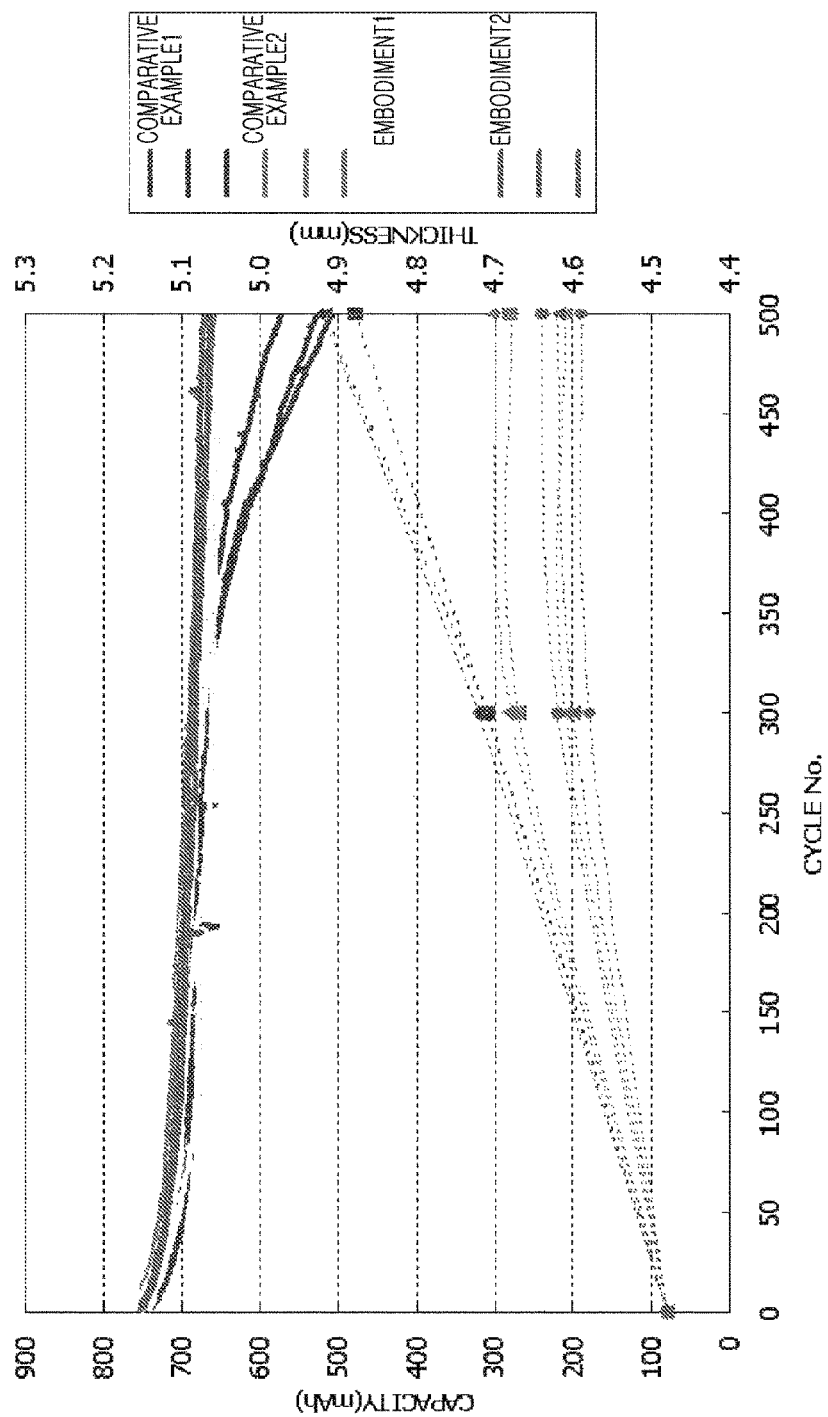
FIG. 1 is a graph showing the changes of capacity and thickness of batteries caused by repeated charging/discharging according to an embodiment and a comparative example.

A non-aqueous electrolyte solution for a lithium secondary battery according to the present invention includes a lithium salt and an organic solvent. Here, the non-aqueous electrolyte solution of the present invention further includes a solvent with a fluoro group and a siloxane compound expressed by the following chemistry figure 1.

$$R_1-Si(R_2)(R_3)-[0-Si(R_4)(R_5)]_n-R_6$$   Chemistry Figure 1 where n is an integer of 1 to 3, and $R_1$, $R_2$, $R_3$, $R_4$, $R_5$ and $R_6$ are independently carbonated hydrogen with 1 to 4 carbons.

The solvent with a fluoro group included in the non-aqueous electrolyte solution of the present invention contributes to improving ion conductivity and thus improving the performance of a battery when being added to a non-aqueous electrolyte solution since it has a high polarity due to the fluoro group, and the solvent contributes to improve a life cycle characteristic since it raises an oxidation potential and thus increases an available voltage range of a battery. The solvent with a fluoro group may be compounds expressed by the following chemistry figures 2 to 5, and these compounds may be added to a non-aqueous electrolyte solution in single or in mixture. Among them, fluoroethylene carbonate is most preferred.

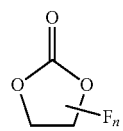

Figure 2:
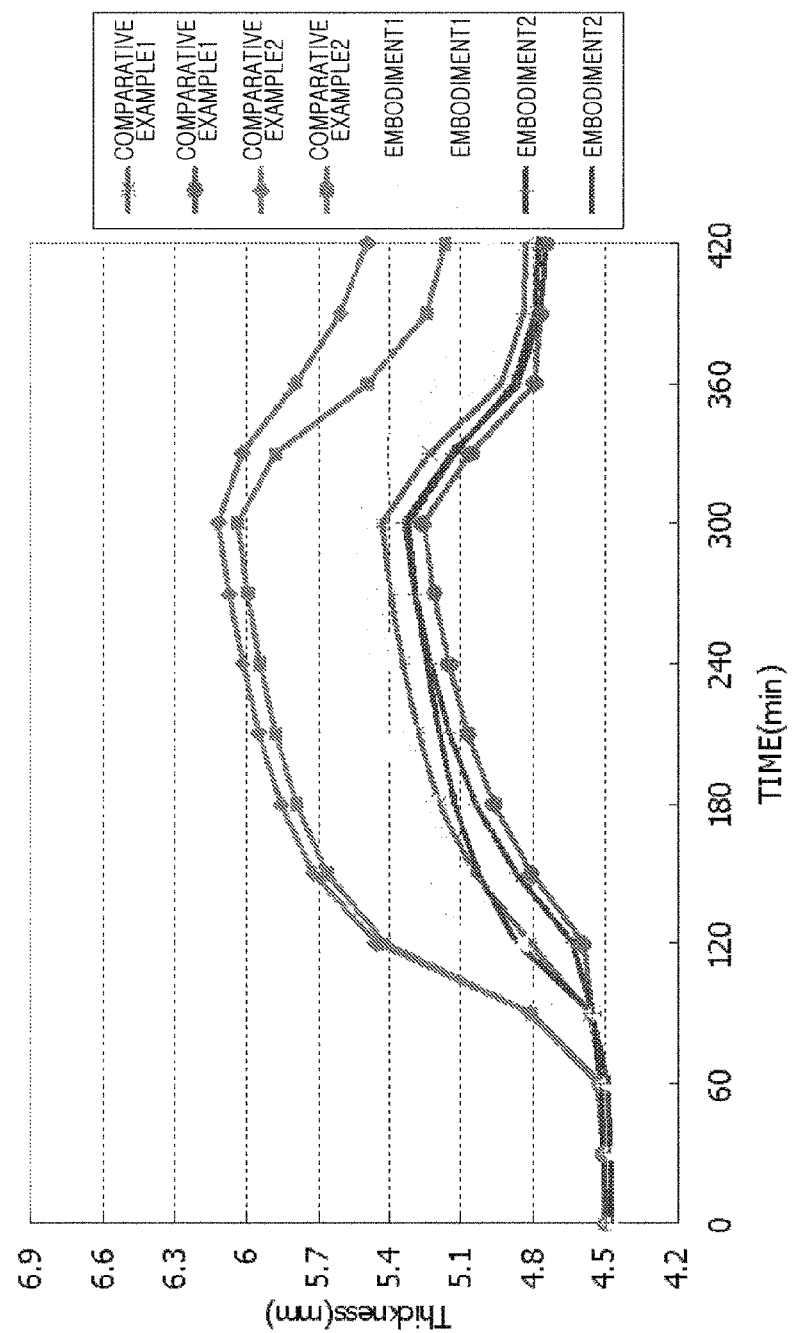
FIG. 2 is a graph showing the change of thickness of batteries caused by high temperature storage according to the embodiment and the comparative example.

Chemistry FIG. 2 where n is an integer of 1 to 4.

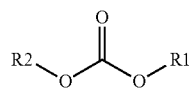

Chemistry FIG. 3 where R1 and R2 are independently carbonated hydrogen group having 1 to 3 carbons, and at least one of R1 and R2 includes 1 to 7 fluorines.

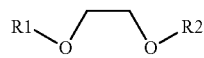

Chemistry FIG. 4 where R1 and R2 are independently carbonated hydrogen group having 1 to 3 carbons, and at least one of R1 and R2 includes 1 to 7 fluorines.

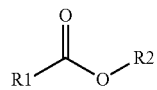

Chemistry FIG. 5 where R1 and R2 are independently carbonated hydrogen group having 1 to 3 carbons, and at least one of R1 and R2 includes 1 to 7 fluorines.

In addition, the non-aqueous electrolyte solution of the present invention includes a siloxane compound expressed by the chemistry figure 1.

As mentioned above, a battery having a non-aqueous electrolyte solution to which a solvent with a fluoro group is added exhibits swelling due to gas generation, which causes a problem in sets such as cellular phones and notebooks. It is estimated that the swelling happens because the solvent with a fluoro group in the non-aqueous electrolyte solution forms hydrofluoric acid (HF) under a high temperature due to the fluoro group, and oxidation of anions in the lithium salt is accelerated due to the presence of hydrofluoric acid.

The siloxane compound contained in the non-aqueous electrolyte solution of the present invention is reacted with hydrofluoric acid generated from the solvent with a fluoro group to decrease the content of hydrofluoric acid in the non-aqueous electrolyte solution, thereby achieving the object of the present invention. Namely, when a siloxane bond is broken, one siloxane compound is reacted with hydrofluoric acid to capture two fluoro groups.

In the chemistry figure 1, $R_1$ to $R_6$ may be branched or linear alkyl, alkene or alkyne, and they may have at least one unsaturated bond. Alkyl may be ethyl, ethyl, propyl, isopropyl, butyl and so on, and aklene may be ethylene, propylene, butylene and so on. Such a compound of the chemistry figure 1 may be 1,3-divinyltetramethyldisiloxane, 1,3-dimethyltetravinylsiloxane, and so on.

In the non-aqueous electrolyte solution for a lithium secondary battery according to the present invention, the contents of the solvent with a fluoro group and the siloxane compound of the chemistry figure 1 may be, for example, 0.5 to 20 weight % and 7 weight % respectively, based on the entire weight of the non-aqueous electrolyte solution.

In the non-aqueous electrolyte solution for a lithium secondary battery according to the present invention, the lithium salt included as an electrolyte may use any one commonly used for electrolyte solutions for lithium secondary batteries. Representatively, the lithium salt may be $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$ and so on. Besides, other compounds such as lactone, ether, ester, acetonitrile, lactam, and ketone may be added to the non-aqueous electrolyte solution for a lithium secondary battery without deteriorating the purpose of the present invention.

In addition, the organic solvent included in the non-aqueous electrolyte solution of the present invention may use any one commonly used for lithium secondary batteries. Representatively, the organic solvent may use a cyclic carbonate such as propylene carbonate, ethylene carbonate and vinylene carbonate, a linear carbonate such as diethyl carbonate, dimethyl carbonate, methylethyl carbonate and dipropyl carbonate, dimethyl sulfoxide, acetonitrile, dimethoxyethane, diethoxyethane, sulforan, gamma-butyrolactone, ethylene sulfite, propylene sulfite, tetrahydrofuran, ethyl propionate and propyl propionate, in single or in mixture, but not limitedly. In particular, ethylene carbonate or a mixture of ethylene carbonate and propylene carbonate may more easily dissociate a lithium salt in an electrolyte due to high dielectric constants, so it contributes to improvement of charging/discharging capacity of a battery. In case propylene carbonate is mixed, a volume ratio of propylene carbonate is preferably ¼ to 1 with respect to ethylene carbonate. If necessary, linear carbonate with low viscosity and low dielectric constant such as dimethyl carbonate and diethyl carbonate may be more preferably used in mixture at a suitable ratio in addition to the above cyclic carbonate, which allows making an electrolyte solution with high electric conductivity.

The non-aqueous electrolyte solution for a lithium secondary battery according to the present invention is applied to a lithium secondary battery having an anode made of carbon material, metal alloy, lithium-containing oxide, silicon-containing material bondable to lithium or the like, which may intercalate or disintercalate lithium ions, and a cathode made of lithium-containing oxide or the like.

The carbon material capable of intercalating or disintercalating lithium ions may employ any material capable of being used as a carbon material anode of a lithium secondary battery such as low-crystalline carbon and high-crystalline carbon. The low-crystalline carbon is representatively soft carbon or hard carbon, and the high-crystalline carbon is representatively natural graphite, Kish graphite, pyrolytic carbon, mesophase pitch based carbon fiber, meso-carbon microbeads, mesophase pitches, and high-temperature sintered carbon such as petroleum or coal tar pitch derived cokes. In addition, alloys containing silicon or oxides such as $Li_4Ti_5O_{12}$ may be used as an anode. At this time, the anode may have a binding agent, which may use various kinds of binder polymer such as PVDF-co-HFP, polyvinylidenefluoride, polyacrylonitrile, polymethylmethacrylate, and styrene-butadiene rubber (SBR).

Also, a cathode active material made of lithium-containing oxide preferably employs a lithium-containing transition metal oxide, for example any one material selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$ and $LiFePO_4$, or their mixtures.

In addition, a separator is commonly interposed between the cathode and the anode, and the separator may use common porous polymer films used as conventional separators, such as porous polymer films made using ethylene homopolymer, propylene homopolymer, ethylene/butene copolymer, ethylene/hexene copolymer and ethylene/methacrylate copolymer, in single or in laminate. In other cases, the separator may use common porous non-woven fabrics such as a non-woven fabric made of glass fiber with a high melt point or polyethylene terephthalate fiber, but not limitedly.

The secondary battery of the present invention has an appearance, not specially limited, but the appearance may be a cylindrical shape using a can, an angled shape, a pouch shape or a coin shape.

MODE FOR INVENTION

Hereinafter, the present invention is explained in more detail using embodiments. However, the following embodiments may be modified in various ways, and the present invention should not be interpreted as being limited thereto. The following embodiments are just given for persons having ordinary skill in the art to understand the present invention in a better way.

Preparation of Non-Aqueous Electrolyte Solution

Embodiment 1

$LiPF_6$ was added to a solvent in which ethylene carbonate (EC), ethylmethyl carbonate (EMC) and diethyl carbonate (DEC) were mixed in a weight ratio of 3:2:5 to make a 1M $LiPF_6$ solution, and then 2 weight % of fluoroethylene carbonate and 0.5 weight % of 1,3-divinyltetramethyldisiloxane were additionally added to the solution, based on the entire weight of the solution, to make a non-aqueous electrolyte solution.

Embodiment 2

$LiPF_6$ was added to a solvent in which ethylene carbonate (EC), ethylmethyl carbonate (EMC) and diethyl carbonate (DEC) were mixed in a weight ratio of 3:2:5 to make a 1M $LiPF_6$ solution, and then 2 weight % of fluoroethylene carbonate and 1 weight % of 1,3-divinyltetramethyldisiloxane were additionally added to the solution, based on the entire weight of the solution, to make a non-aqueous electrolyte solution.

Comparative Example 1

A non-aqueous electrolyte solution was prepared in the same way as the embodiment 1, except that fluoroethylene carbonate and 1,3-divinyltetramethyldisiloxane were not added.

Comparative Example 2

A non-aqueous electrolyte solution was prepared in the same way as the embodiment 1, except that only 2 weight % of fluoroethylene carbonate was added without 1,3-divinyltetramethyldisiloxane.

The non-aqueous electrolyte solutions prepared according to the embodiments and the comparative examples were stored at a high temperature (80° C.) for 5 days, and then an amount of generated carbon dioxide and the degree of anion oxidation of the lithium salt in the non-aqueous electrolyte solution were measured. The measurement results are shown in the following table 1.

TABLE 1

|  | Amount of Moisture before High Temperature Storage (ppm) | Amount of generated $CO_2$ (ratio) | $PF_6^-:PO_2F_2^-$ |
|---|---|---|---|
| Comparative Example 1 | 16.34 | 30 | 96:1 |
| Comparative Example 2 | 18.36 | 710 | 45:1 |
| Embodiment 1 | 20.18 | 102 | 92:1 |
| Embodiment 2 | 36.65 | 98 | 92:1 |

Seeing the table 1, it would be understood that the non-aqueous electrolyte solutions of the embodiments 1 and 2 to which 1,3-divinyltetramethyldisiloxane is added together with fluoroethylene carbonate exhibit greatly decreased amount of generated gas (carbon dioxide) after high temperature storage and less anion oxidation of lithium salt in comparison to the non-aqueous electrolyte solutions of the comparative example 2.

Manufacture of Battery

Angled lithium secondary batteries with a thickness of 4.2 mm were made in a common way using the non-aqueous electrolyte solutions prepared in the embodiments and the comparative example, a mixture of $LiCoO_2$ and $(Ni_{0.53}Co_{0.20}Mn_{0.27})O_2$ at a ratio of 2:1 as a cathode, and artificial graphite as an anode. The electrolyte solution was injected to the made angled batteries, and then basic capacities of the batteries were checked at a room temperature after an activation process and a normal temperature and high temperature aging periods. The batteries were charged by 1 C to 4.2V under a constant current/constant voltage condition, and then discharged by 1 C to 3.0V under a constant current condition, which is called basic charging/discharging. For the made batteries, life cycle, performance characteristics and high temperature storage characteristics were measured in the following way.

Life Cycle Characteristics

The batteries prepared in the above ways (three batteries for each case) were initially charged/discharged, and then basic charging/discharging was conducted thereto at a normal temperature (25° C.) 500 times. Here, the changes of capacity and thickness of the batteries according to the number of charging/discharging are shown in FIG. 1. In FIG. 1, the upper graph represents the change of capacity of batteries, and the lower graph represents the change of thickness of batteries.

Seeing FIG. 1, it would be understood that the batteries of the comparative example 2 and the embodiments 1 and 2, which contains fluoroethylene carbonate, exhibit less change of capacity at repeated charging/discharging in comparison to the battery of the comparative example 1 in which fluoroethylene carbonate is not included.

High Temperature Storage Characteristics

The batteries prepared in the above ways (two batteries for each case) were initially charged/discharged, and then charged to 4.2V, respectively. The batteries were put into a temperature control oven and heated from 25° C. to 90° C. during 1 hour, then preserved at 90° C. for 4 hours, then cooled to 25° C. during 1 hour, and then preserved at 25° C. for an hour. The thickness of the batteries was measured using suitable equipment at 30-minute intervals. The measurement results are shown in FIG. 2. Also, 0.2 C discharge capacity and 1 C discharge capacity of the batteries were measured before the test, and residual capacity and recovery rate were measured after the test. The measurement results are shown in the following table 2.

TABLE 2

|  | After | | |
|---|---|---|---|
|  | Residual | 1 C Recovery (%) | 0.2 C Recovery (%) |
| Comparative Example 1 | 722.4 | 80.4 | 83.2 |
|  | 709.9 | 76.2 | 82.7 |
| Comparative Example 2 | 704.4 | 88.5 | 90.0 |
|  | 707.3 | 89.7 | 91.2 |
| Embodiment 1 | 718.3 | 93.4 | 94.7 |
|  | 718.9 | 92.4 | 94.6 |
| Embodiment 2 | 724.3 | 92.0 | 94.7 |
|  | 708.5 | 90.5 | 94.9 |

Seeing FIG. 2, it would be understood that the battery of the comparative example 2 to which a non-aqueous electrolyte solution containing only fluoroethylene carbonate is added exhibits great swelling, while the batteries of the embodiments to which non-aqueous electrolyte solutions containing 1,3-divinyltetramethyldisiloxane together with fluoroethylene carbonate is applied exhibit great improvement in swelling. Considering that a commonly allowable swelling is 1.1 mm or less, the improvement in swelling of the batteries of the embodiments is considered as greatly meaningful. Also, as seen from the table 2, it would be understood that the batteries of the embodiments exhibit increased recovery capacity in comparison to the batteries of the comparative examples.

The invention claimed is:

1. A non-aqueous electrolyte solution for a lithium secondary battery, which includes a lithium salt and an organic solvent, wherein the lithium salt is any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ and $LiC_4BO_8$, or their mixtures, wherein the non-aqueous electrolyte solution further includes a solvent having a fluorinated compound and a siloxane compound in the content of 0.5 to 20 weight % and 0.03 to 7 weight %, respectively, based on the entire weight of the non-aqueous electrolyte solution, and wherein the siloxane compound is 1,3-divinyltetramethyldisiloxane and 1,3-dimethyltetravinylsiloxane.

2. The non-aqueous electrolyte solution for a lithium secondary battery according to claim 1, wherein the solvent having a fluoro group is any one selected from compounds expressed by the following Chemistry Figures 2 to 5, or their mixtures:

Chemistry FIG. 2

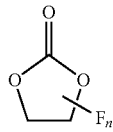

where n is an integer of 1 to 4,

Chemistry FIG. 3

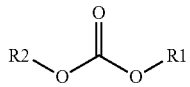

where R1 and R2 are independently hydrocarbon group having 1 to 3 carbons, and at least one of R1 and R2 includes 1 to 7 fluorines, Chemistry FIG. 4

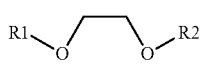

where R1 and R2 are independently hydrocarbon group having 1 to 3 carbons, and at least one of R1 and R2 includes 1 to 7 fluorines, and Chemistry FIG. 5

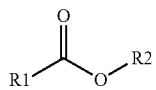

where R1 and R2 are independently hydrocarbon group having 1 to 3 carbons, and at least one of R1 and R2 includes 1 to 7 fluorines.

3. The non-aqueous electrolyte solution for a lithium secondary battery according to claim 2,
wherein the solvent having a fluoro group is fluoroethylene carbonate.

4. The non-aqueous electrolyte solution for a lithium secondary battery according to claim 1,
wherein the organic solvent is any one selected from the group consisting of a cyclic carbonate selected from the group consisting of propylene carbonate, ethylene carbonate and vinylene carbonate, or their mixtures, a linear carbonate selected from the group consisting of diethyl carbonate, dimethyl carbonate, methylethyl carbonate and dipropyl carbonate, or their mixtures, dimethyl sulfoxide, acetonitrile, dimethoxyethane, diethoxyethane, sulforan, gamma-butyrolactone, ethylene sulfite, propylene sulfite, tetrahydrofuran, ethyl propionate and propyl propionate, or their mixtures.

5. The non-aqueous electrolyte solution for a lithium secondary battery according to claim 1,
wherein the organic solvent is ethylene carbonate or a mixture of ethylene carbonate and propylene carbonate.

6. A lithium secondary battery, which includes an anode, a cathode and a non-aqueous electrolyte solution,
wherein the non-aqueous electrolyte solution is a non-aqueous electrolyte solution defined in claim 1.

* * * * *